United States Patent Office 3,515,927
Patented June 2, 1970

3,515,927
CAMERA TUBE INCLUDING MEANS FOR REGENERATION OF LEAD MONOXIDE TARGET LAYER
Edward Fokko de Haan and Paulus Philippus Maria Schampers, Emmasingel, Eindhoven, Netherlands, assignors, by mesne assignments, to U.S. Philips Corporation, New York, N.Y., a corporation of Delaware
Filed June 21, 1968, Ser. No. 738,958
Claims priority, application Netherlands, July 22, 1967, 6710185
Int. Cl. H01k 1/52; H01j 61/28
U.S. Cl. 313—179                                3 Claims

ABSTRACT OF THE DISCLOSURE

A camera tube having a lead monoxide target layer has a substance which upon heating evolves at least one of the gases oxygen and water vapor, the substance being mounted in heat-receiving proximity to the tube cathode to evolve at least one of the gases in such quantity as to compensate for its loss from the target.

---

Figure 1:
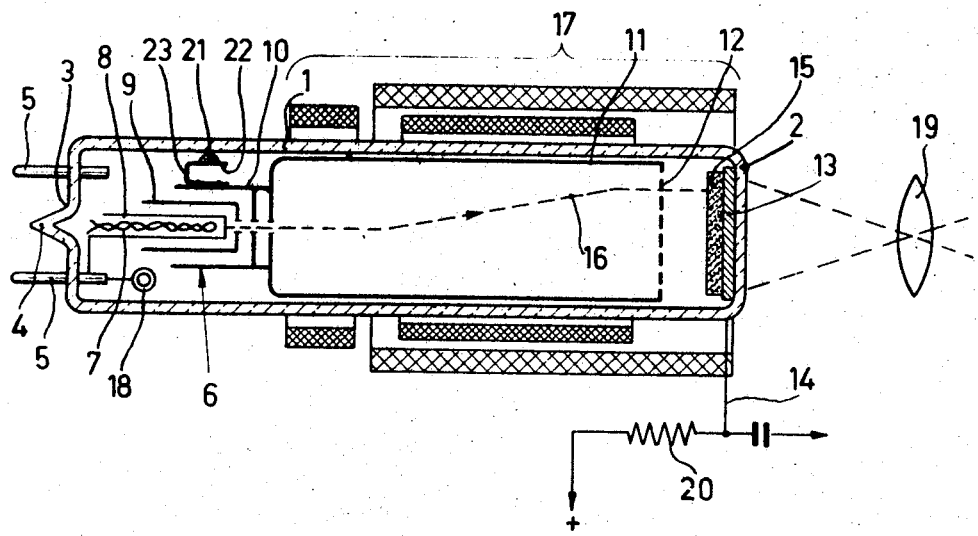

The invention relates to a method of regenerating the radiation-sensitive target plate of a camera tube, which target plate consists mainly of a metal oxide layer applied to a conductive electrode, whose surface remote from the electrode can be scanned by an electron beam in order to obtain output signals corresponding to a charge image on the target plate, and to a camera tube suitable for carrying out said method. The term "regeneration" has to be understood to mean herein the restoration of given desired properties of the target plate which have suffered in the course of time by use.

It is known that with camera tubes of the Vidicon type comprising a target plate consisting mainly of a metal oxide, particularly lead monoxide, the phenomenon may occur that after a number of operational hours the dark current increases above a permissible value, often attended with a reduction in resolving power. This phenmenon is presumably due to loss of oxygen of the target plate during the use of the tube, particularly to loss of oxygen of that portion of the target plate which is scanned by the electron beam. A further phenomenon appearing particularly in camera tubes of the kind set forth, in which in the manufacture of the target plate a gas atmosphere containing a mixture of oxygen and water vapour or a similar gaseous hydrogen compound, for example, hydrosulphide, hydroselenide and hydrotelluride is used, is a gradual change of the spectral sensitivity particularly at one end of the sensitivity range. It is thought that this variation is not in the first place due to loss of oxygen but rather due to the loss of water vapour. Both oxygen and water vapour transferred from the target plate to the space in the tube are absorbed by the conventional getter in the tube.

A known measure to obtain an advantageous lifetime of a camera tube of the kind set forth, particularly with respect to the dark current, consists in the use of an oxygen bombardment in the manufacture of the target plate. Presumably, such a quantity of oxygen is thus built in the target plate surface scanned by the electron beam that during use the loss of oxygen of the target plate becomes manifest only to a restricted extent in a decay of the properties.

The invention has for its object to provide a measure compensating for the harmful influence of loss of oxygen and/or water vapour of the target plate.

The invention is based on the recognition of the fact that changes of the properties of the target plate due to loss of oxygen or water vapour during the use of the tube can be remedied for by causing the target plate to absorb oxygen or water vapour replacing the oxygen or water vapour lost. By experiments the applicant has found that the replacement of oxygen or water vapour lost from the target plate can be carried out in a simple manner by exposing the target plate during operation or in an interval to oxygen or water vapour respectively.

Consequently, the method accordingly to the invention is characterized in that after a number of operational hours a gas atmosphere having as a single active constituent a gas of the group of oxygen, water vapour and mixtures thereof is caused to act upon the target plate, the partial pressure of the oxygen, if present, being lower than 1 torr and that of the water vapour being lower than 0.1 torr. The wording: a gas atmosphere caused to act upon the target plate containing as a single active constituent a gas of said group, is meant to denote that this gas atmosphere may contain, in addition, one or more other gases, provided this (these) gas(es) do(es) not affect the target plate in any respect. This applies, for example, to inert gases such as helium, argon and nitrogen.

In a first embodiment of the method according to the invention the target plate may be regenerated during intervals in the use of the camera tube by connecting the tube to a pump system, by allowing said gas atmosphere to enter the tube through said pump system and by again exhausting the tube and sealing it after the gas atmosphere has acted upon the target plate. However, an easier and simpler method is characterized in that without the camera tube being opened, at least one of the gases oxygen and water vapour is released by heating a preparation arranged at a fixed area differing from that of the target plate in the tube. The invention also relates to a camera tube appropriate for carrying out the last-mentioned form of the method according to the invention, which tube is characterized in that it is provided internally with at least one preparation arranged at an area differing from that of the target plate and capable of evolving, when heated, at least one of the gases oxygen and water vapour.

The invention will be described more fully with reference to a few embodiments and to the figures of the accompanying drawing. In this drawing FIG. 1 is a schematic longitudinal sectional view of a camera tube of the Vidicon type suitable for carrying out the method according to the invention and FIG. 2 shows part of the longitudinal sectional view of the same type of camera tube suitable for carrying out a slightly modified method according to the invention.

Figure 2:
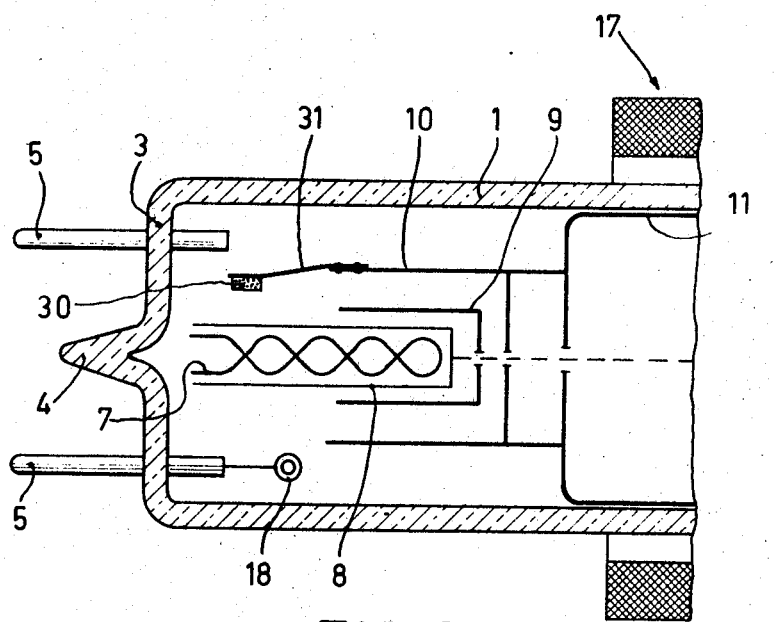

The camera tube shown in a longitudinal sectional view in FIG. 1 comprises an exhausted, elongated, cylindrical bulb 1 of glass, which is sealed at one end by a glass window 2 and at the other end by a glass foot 3. This foot, a central portion of which is formed by a sealed hollow exhaust tube 4, comprises through-connection pins 5, which are electrically connected inside the bulb to various parts of the electrode system designated as a whole by 6. The electrode system 6 comprises a thermionic cathode 8 to be heated by a filament wire 7, a Wehnelt cylinder 9 and a perforated anode 10, which is electrically connected to a cylindrical electrode 11. The electrode 11 is provided on the side of the window 2 with a gauze-shaped electrode 12.

The window 2 is provided on the inner side with a transparent, electrically good conducting signal electrode 13, consisting for example of conductive tin oxide and connected to a current conductor 14, passed to the outside. The signal electrode 13 is provided by vapour deposition in a gas atmosphere containing oxygen and water vapour with a photo-sensitive layer 15 of a thickness of about 15 to 15µ of lead monoxide (PbO). The layer 15, forming the target plate in the tube, can be scanned on the surface remote from the window 2 by means of an electron beam 16 emanating from the cathode 8 and focused and deflected by means of the conventional focusing and deflection coils, designated in common by 17, surrounding the tube.

The camera tube shown in FIG. 1 comprises furthermore in the proximity of the foot 3 one or more getter-covered metal rings 18, which may each be supported from a through-connection pin 5 and which can be heated by passing through electric current from the outside or by high-frequency heating. Getter material of at least one of these rings is already employed in known manner in one of the last stages of the manufacture of the tube.

By means of an optical system indicated schematically by a single lens 1 an image to be converted into electrical signals is projected in operation of the tube onto the target plate 15. These electrical signals are obtained as usual during scanning of the target plate 15 by means of the electron beam 16 across a signal resistor 20 included in the current conductor 14, via which signal resistor the signal electrode 13 receives a bias voltage of 20 to 60 v. which is positive to the cathode 8.

The material of the target plate 15—in this case lead monoxide, but a different metal oxide, for example, zinc oxide (ZnO) or bismuth trioxide ($Bi_2O_3$) may be used—has p-type conductivity over a small depth on the surface to be scanned by the electron beam 16. This may be obtained by incorporating more oxygen than the quantity corresponding to the stoichiometric composition; a further possibility consists in a local doping of, for example, thallium, in the lead monoxide. This thin zone of p-type conducting material at the free surface of the target plate serves to provide a barrier against the transition of electrons absorbed from the electron beam 16 by the free surface of the layer 15 towards the signal electrode 13 or in other words, to counteract dark current.

The target plate 15 consists for far the major part of material which behaves essentially as intrinsically conducting material so that a substantially constant electric field strength determined by the voltage between the cathode 8 and the signal electrode 13 prevails in the target plate substantially throughout the thickness thereof. This is important for the spectral sensitivity which is at the optimum when such an electric field prevails at any area where charge carriers are released by incident light independently of the penetration depth thereof. Such apparently intrinsically conducting lead monoxide may be obtained by vapour deposition in a gas atmosphere consisting of a mixture of oxygen and water vapour, the pressure of the mixture lying between $150 \times 10^{-5}$ and about $2000 \times 10^{-5}$ torr and the partial pressure of the water vapour being about 20 to 70% thereof.

In a camera tube of the kind described above, when having been in use for some time, for example a few hundred hours, an inadmissible increase in the dark current may occur, whilst in addition a decrease in spectral sensitivity at one end of the sensitivity range may appear. These two phenomena are ascribed to a change of the material of the target plate 14, the first mainly to loss of oxygen of the material at the free surface of the target plate and the second mainly to the loss of water vapour, as the case may be, together with the loss of oxygen.

In a first embodiment a camera tube of the kind set forth, exhibiting a decay of properties by use, can be regenerated by connecting the tube by the exhaust tube 4 with a pump system, by opening the end of the exhaust tube, for example, by means of a piece of magnetic material inside the duct movable from the outside by a magnet and by admitting into the tube gas formed by oxygen, water vapour or both, if desired, together with an inert gas, for example, helium or nitrogen. The inert gas does not play an active role, it may be employed as a kind of carrier for the oxygen or the water vapour in order to obtain a correct dosage. If the regeneration of the target plate 15 aims mainly at the suppression of an excessively increased dark current, the introduction of oxygen alone, if desired together with an inert gas, may suffice. Changes of the spectral sensitivity of the target plate may best be eliminated by introducing, in addition, water vapour, whilst the supply of oxygen may be dispensed with when the dark current of the tube does not give reasons for complaint. The gas supplied through the pump system is allowed to act upon the target plate for some time, after which the tube is again exhausted and sealed, the tube being then again gettered. The tube having a target plate thus regenerated has a prolonged lifetime.

The duration of the said action of the gas supplied by the pump system on the target plate depends upon the pressure of the oxygen and/or the water vapour. With higher pressures the time of action has to be shorter. It is highly desirable to keep the oxygen pressure below 1 torr and the water vapour, which is more rapidly absorbed by the target plate than the oxygen, below 0.1 torr in order to avoid such short times of action that they can no longer or can scarcely be controlled. Satisfactory results have been obtained by means of a gas atmosphere containing only oxygen and no water vapour, the oxygen pressure being 100 to $1000 \times 10^{-5}$ torr with a period of action of about 5 minutes. With water vapour alone, without oxygen a water-vapour pressure of about $2000 \times 10^{-5}$ torr and a period of action of about 2 minutes may suffice. An improvement in the dark current and in the blue and red sensitivity can be achieved with a target plate no longer satisfying the requirements in this respect by causing a mixture of oxygen and water vapour in the manner described to act upon the target plate, the partial oxygen pressure being 100 to $500 \times 10^{-5}$ torr, the partial water-vapour pressure being about $1000 \times 10^{-5}$ torr and the period of action being a few minutes. In all these cases the temperature of the target plate during the action of the oxygen and/or the water vapour was equal to the normal ambient temperature. A higher temperature of the target plate, preferably, however, not higher than about 120° C. (which temperature is preferred in the manufacture of the target plate by vapour deposition), as well as a slightly lower temperature have little or no influence.

The method according to the invention described above has various disadvantages. In the first place the camera tube has to be connected with the pump system in order that the target plate is not exposed to the ambient atmosphere, so that it is necessary to use a magnetically movable object in the pump duct in order to open the exhaust tube only after the duct is sealed. In the second place the regeneration described requires a vacuum apparatus allowing a correct dosing of the gases to be introduced into the tube.

These advantages are obviated by the embodiment to be described hereinafter. It is based on a camera tube of the kind set forth with reference to FIG. 1, in which tube with a view to said regeneration a preparation is incorporated by a special step in the manufacture to produce oxygen and/or water vapour upon heating. In FIG. 1 such a preparation is designated by 21. It is applied to a metal ring or plate 22, fastened to a support 23, which is welded to the outer side of the anode 10. An appropriate preparation evolving oxygen when heated is, in particular, lead dioxide ($PbO_2$); the pressure of equilibrium of the oxygen, at the normal operational temperature of the tube (30 to 40° C.) is lower than about $1 \times 10^{-5}$ torr, at 150° C. about $100 \times 10^{-5}$ torr and at 700° C. about $1000 \times 10^{-5}$ torr.

Previously dried magnesium hydroxide and calcium hydroxide are suitable preparations for developing water vapour when heated; at 30 to 40° C. both have a pressure of equilibrium of the water vapour of less than $1 \times 10^{-5}$ torr and at 350° C. magnesium hydroxide loses much, if not all the water vapour and at about 110 to 150° C. calcium hydroxide has a pressure of equilibrium of the water vapour of about 100 to $1000 \times 10^{-5}$ torr.

At a plurality of fixed places, for example, in different areas around the anode 10, similar supports 22–23, each having a suitable preparation 21, may be provided in the tube, one preparation being intended for developing oxygen and the other water vapour. The supports 22–23 have then to be disposed so that the preparations can be heated from without, for example by high-frequency agency or by means of a laser beam.

When the properties of the target plate 15 of the tube described have declined by use, they can be regenerated without opening the tube by heating one or more preparations 21 or their supports so that in accordance with the heated preparations an oxygen and/or a water-vapour pressure is produced in the tube which corresponds with that mentioned with reference to the preceding example. The oxygen and/or the water vapour are also allowed as in the first embodiment to act upon the target plate 15 for a period of time adjusted to the pressure, after which the tube is again gettered by heating one of the getter rings 18. The getter reduces the pressure of the oxygen and/or the water vapour in the tube to the initial low, harmless value, after which the tube is again ready for use.

It is possible to dispose oxygen and/or water-vapour developing preparations at such fixed places in the tube that the regeneration of the target plate is performed continuously in the operation of the tube, so that no special process is required. For this purpose such a preparation is in the manufacture of the tube arranged in the proximity of the cathode 8 such that in operation the preparation is heated by radiation from the cathode and/or by thermal conduction at a temperature at which oxygen or water-vapor is given off to an extent such that the pressure thereof in the tube is, on an average, not more than about $1 \times 10^{-5}$ torr. When calcium hydroxide is used as a preparation a temperature of about 50 to 100° C, may be used; with magnesium hydroxide it may be slightly higher and with lead dioxide as a preparation a temperature of about 50 to 70° C. has been found to be appropriate. These temperatures will, as a rule, be higher than those at which the pressure of equilibrium of the oxygen or the water vapour is about $1 \times 10^{-5}$ torr, since a portion of the evolved gas is bound by the active getter material provided in the tube.

FIG. 2 shows on an enlarged scale the foot part of a camera tube corresponding substantially completely with that of FIG. 1. The same elements are therefore designated by the same reference numerals. FIG. 2 shows a potential disposition of a preparation 30 on a support 31, connected with the anode 10, where the support together with the preparation is arranged in the field of radiation of the cathode 8 so that in operation it is heated at a temperature at which in accordance with the nature of the preparation oxygen or water vapour is released therefrom.

The quantities of preparations to be incorporated in the tube may be small; usually less than 10% by weight of the material of the target plate 15 will suffice. This means that with a camera tube comprising a lead monoxide target plate about $20\mu$ thick, having a diameter of about 30 mms. a few to 10 mg. of lead dioxide, magnesium hydroxide or calcium hydroxide are sufficient.

What is claimed is:

1. A camera tube including a radiation-sensitive target comprising a transparent, conductive electrode and a layer thereon consisting mainly of lead monoxide, said layer during operation of said tube losing oxygen and/or water vapor with ensuing undesirable spectral sensitivity changes, said tube further including an electron gun having a thermal cathode therein for scanning said lead monoxide layer, and means for minimizing said undesirable spectral sensivity changes comprising a substance evolving at least one of the gases oxygen and water vapor upon heating and means for supporting said substance in heat-receiving proximity to said electron gun for evolving at least one of said gases in sufficient quantity substantially to counteract loss from said lead monoxide layer.

2. A camera tube as claimed in claim 1 in which said substance contains lead dioxide.

3. A camera tube as claimed in claim 1 in which said substance contains previously dried magnesium hydroxide or calcium hydroxide.

References Cited

UNITED STATES PATENTS 3,372,056   3/1968   De Haan et al.

ROBERT SEGAL, Primary Examiner

U.S. Cl. X.R.

313—65; 316—5